United States Patent
Howard et al.

(10) Patent No.: US 7,256,588 B2
(45) Date of Patent: Aug. 14, 2007

(54) CAPACITIVE SENSOR AND METHOD FOR NON-CONTACTING GAP AND DIELECTRIC MEDIUM MEASUREMENT

(75) Inventors: Jack E. Howard, Gardnerville, NV (US); Oliver H. Lieder, Carson City, NV (US); Brian Burket Bowlds, Minden, NV (US); Paul Austin Lindsay, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 10/825,185

(22) Filed: Apr. 16, 2004

(65) Prior Publication Data

US 2005/0231214 A1 Oct. 20, 2005

(51) Int. Cl.
G01R 27/26 (2006.01)
(52) U.S. Cl. .............. 324/663; 324/658; 324/661; 324/662; 324/671; 324/672
(58) Field of Classification Search ............... 324/661, 324/663, 671
See application file for complete search history.

(56) References Cited

U.S. PATENT DOCUMENTS

| | | | | |
|---|---|---|---|---|
| 4,058,765 A * | 11/1977 | Richardson et al. | ........ | 324/669 |
| 4,675,670 A | 6/1987 | Lalonde et al. | ........ | 340/670.3 |
| 5,012,196 A | 4/1991 | Baranski | ........ | 324/662 |
| 5,070,302 A | 12/1991 | Marcus et al. | ........ | 324/662 |
| 5,513,539 A | 5/1996 | McLaughlin et al. | ........ | 73/865.9 |
| 5,563,344 A | 10/1996 | Kaiser et al. | ........ | 73/514.24 |
| 5,990,807 A | 11/1999 | Cloutier et al. | ........ | 340/870.3 |
| 6,075,464 A | 6/2000 | Cloutier et al. | ........ | 340/870.3 |
| 6,307,385 B1 | 10/2001 | Tardif et al. | ........ | 324/678 |
| 6,552,667 B1 | 4/2003 | Missout et al. | ........ | 340/870.3 |
| 2002/0070729 A1 * | 6/2002 | Muller | ........ | 324/207.26 |

FOREIGN PATENT DOCUMENTS

FR 2 756 048 5/1998

OTHER PUBLICATIONS

European Search Report mailed Jul. 14, 2005.

* cited by examiner

*Primary Examiner*—Walter Benson
*Assistant Examiner*—John Zhu
(74) *Attorney, Agent, or Firm*—Nixon & Vanderhye P.C.

(57) ABSTRACT

A method for non-contact measurement of a displacement between a surface and a capacitive sensor comprised of at least two superimposed conductive plates electrically insulated one from the other and a sensor circuit coupled to the plates including: positioning the capacitive sensor proximate to the surface such that the displacement is a distance of a gap between the surface and one of the plates; applying a high frequency signal to the plates; applying the high frequency signal and a sensor plate to control a voltage gain of an amplifier in the circuit, where the capacitance on the sensor is indicative of the displacement between the sensor and surface; differentiating an output of the amplifier and the high frequency signal, and determining a value of the displacement based on the difference between the output of the amplifier and the high frequency signal.

34 Claims, 2 Drawing Sheets

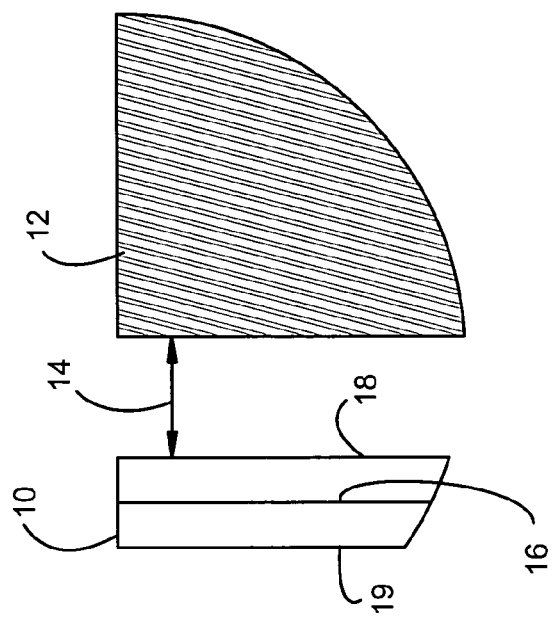
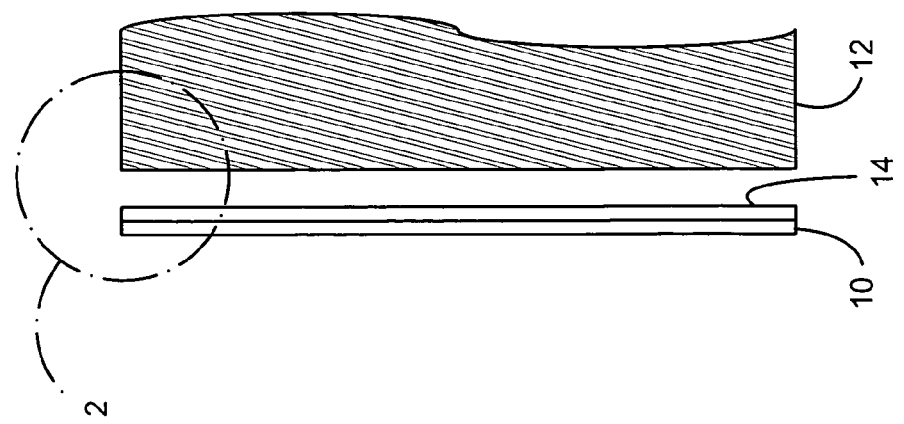

CAPACITIVE SENSOR AND METHOD FOR NON-CONTACTING GAP AND DIELECTRIC MEDIUM MEASUREMENT

BACKGROUND OF THE INVENTION

This invention relates to a method and system for non-contact measurement of a gap between a sensor and a conductive or non-conductive surface using a capacitive measurement device with a plurality conductive plates that permits measurement of material depth and dielectric changes in solids and fluids.

Non-contact gap measurement sensors having two parallel superimposed conductive plates, which are electrically insulated from one another, are disclosed in, for example, U.S. Pat. Nos. 4,675,670; 5,990,807; 6,075,464 and 6,552,667. A high frequency signal is placed on the first plate of the sensor. By measuring the capacitance between the sensor and a proximate surface, the sensor generates a signal that is indicative of the gap between the sensor and the surface.

A difficulty with existing non-contact capacitive sensors is that the capacitive signal generated by the sensor that is representative of the gap may be overshadowed by noise. The noise may arise from capacitance variations of extension cables between the sensor and its associated electronics, signal pickup electronics and transformer, and stray capacitances from the signal pickups. The noise due to these capacitance variations may be much greater than the capacitance of the signal indicative of the gap.

Another difficulty in using a capacitive sensor is that capacitance is formed between the sensor and any surfaces which come near the sensor, including surfaces behind the sensor. Some sensitivity to surfaces behind the sensor remains even when an active shield plate is placed behind the sensor plate.

There is a need for a capacitive measurement method and a non-contact capacitive measurement sensor that is less sensitive to variations in capacitance, in an insulator between the two plates of the sensor and variations in the impedance of the cables connecting the sensor to the circuit. Excessive sensitivity to these variations may increase the difficulty in manufacturing the sensor and increase the sensor sensitivity to temperature and other environmental factors.

BRIEF DESCRIPTION OF THE INVENTION

An electronic circuit which directly measures the capacitance of a sensor relative to a surface or dielectric medium by having the capacitance change the voltage gain of an amplifier and which is used to provide a non contacting gap measurement. Also, a capacitive sensor having three parallel superimposed conductive plates, with a sensor plate which is electrically insulated from the other plates, with greatly reduced sensitivity to surfaces behind the sensor.

The invention may be embodied as a method for non-contact measurement of a displacement between a surface and a capacitive sensor comprised of at least two superimposed conductive plates electrically insulated one from the other and a sensor circuit coupled to the plates including: positioning the capacitive sensor proximate to the surface such that the displacement is a distance of a gap between the surface and one of the plates; applying a high frequency signal to the plates; applying the high frequency signal and a signal from a sensor plate of the conductive plates to control a voltage gain of an amplifier in the circuit, where the applied sensor signal is indicative of the displacement between the sensor and surface; differentiating an output of the amplifier and the high frequency signal, and determining a value of the displacement based on the difference between the output of the amplifier and the high frequency signal.

The invention may also be embodied as a method for non-contact measurement of a displacement between a surface and a capacitive sensor comprised of at least three superimposed conductive plates electrically insulated from each other and a sensor circuit coupled to the plates, wherein said plates include a sensor plate, an active shield plate sandwiched between a sensor plate and a passive shield plate, said method comprising: (a) positioning the capacitive sensor proximate to the surface such that the displacement is a distance of a gap between the surface and the sensor plate; (b) applying a high frequency signal to the sensor plate and to the active shield plate; (c) applying a signal induced on the sensor circuit by the high frequency signal and the sensor plate to control a voltage gain of an amplifier in the circuit, said applied sensor signal being indicative of the displacement between the sensor and surface; (d) differentiating the output of the amplifier and the high frequency signal, and (e) determining a value of the displacement based on the difference between the applied signal and the high frequency signal.

The invention may also be embodied as a non-contact capacitive sensor comprising: a sensor plate which is configured to be displaced from a surface to measure a capacitance of a gap between the surface and sensor plate; an active shield plate over said sensor plate and insulated from said sensor plate, wherein a high frequency input signal is applied to the active shield plate and sensor plate; an effective ground shield plate connected through a first resistor to a ground, over said active shield plate so as to sandwich the active shield plate between the ground shield plate and the sensor plate and said ground shield plate is insulated from the active shield plate; a second resistor connected between the passive shield and the active shield providing a dc path through the sensor.

The invention may be further embodied as a method for non-contact measurement of a dielectric related characteristic of a medium between a surface and a capacitive sensor comprised of at least two superimposed conductive plates electrically insulated one from the other and a sensor circuit coupled to the plates, said method comprising: positioning said capacitive sensor proximate to the surface such that the medium is between the surface and a sensor plate of the plates; applying a high frequency signal to the plates and a dielectric of the medium affects a response signal of the sensor plate to the high frequency signal; applying the high frequency signal and the response signal from the sensor plate to control a voltage gain of an amplifier in the circuit, said response signal being indicative of the medium between the sensor and surface; differentiating an output of the amplifier and the high frequency signal, and determining a value of the dielectric based on the difference between the output of the amplifier and the high frequency signal.

The invention may also be embodied as a method for non-contact measurement of a medium proximate to a capacitive sensor comprised of at least two superimposed conductive plates electrically insulated one from the other and a sensor circuit coupled to the plates, said method comprising: positioning said capacitive sensor proximate to the medium; applying a high frequency signal to the plates; applying the high frequency signal and a signal from a sensor plate of the conductive plates to control a voltage gain of an amplifier in the circuit, said signal from the sensor plate being indicative of a property of the medium; differentiating an output of the amplifier and the high frequency signal, and determining a value of the property of the medium based on the difference between the output of the amplifier and the high frequency signal.

BRIEF DESCRIPTION OF THE DRAWINGS

FIGS. 1 and 2 are schematic diagrams of a non-contacting capacitive sensor. FIG. 2 is an enlarged view of an end section of the sensor and a surface shown in FIG. 1.

DETAILED DESCRIPTION OF THE INVENTION

Figure 3:
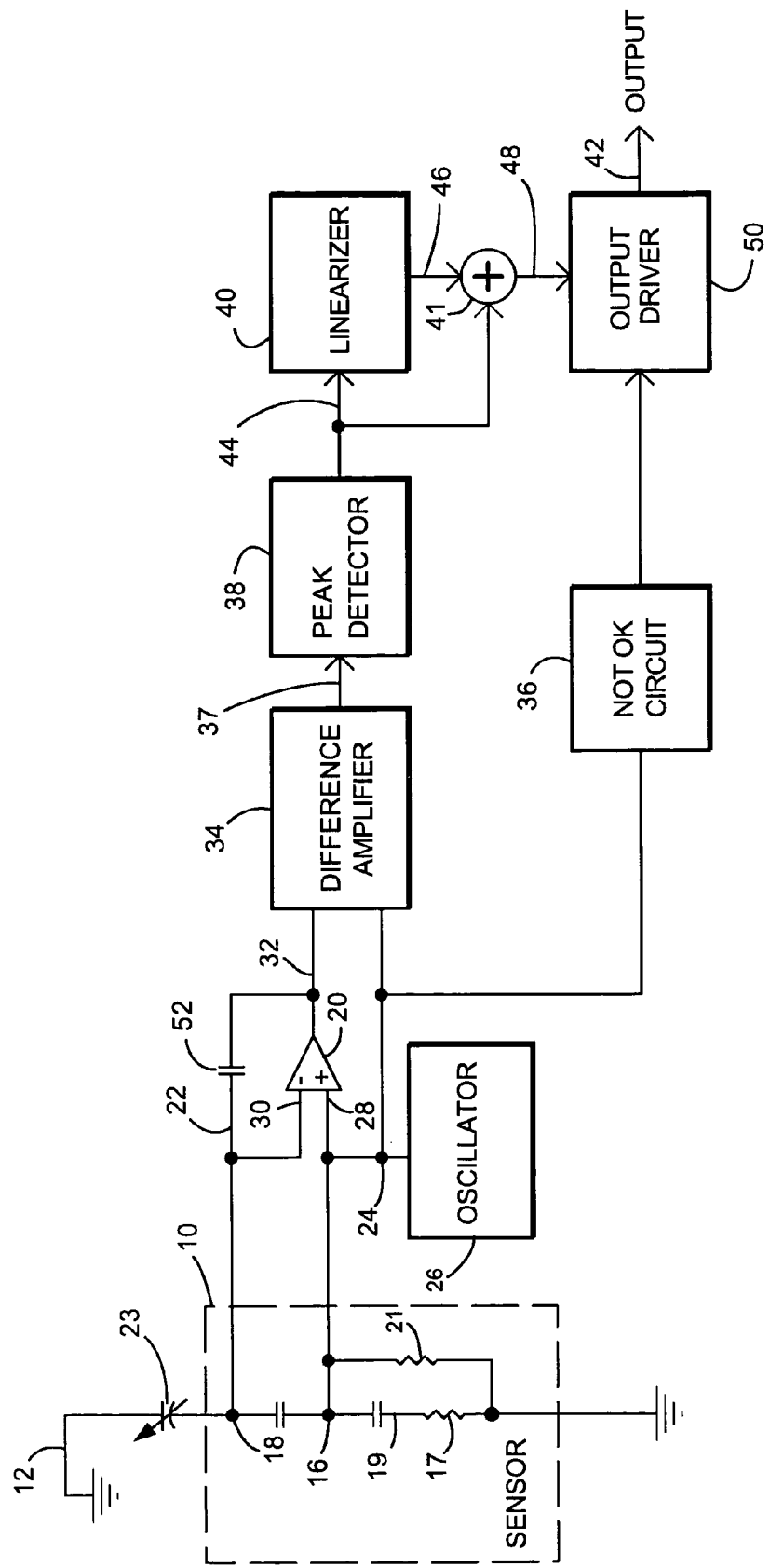
FIG. 3 is a schematic diagram of an electronic circuit associated with the capacitive sensor.

FIGS. 1 and 2 show schematically a sensor 10 near a surface 12 and a gap 14 between the sensor and surface. The sensor generates a signal indicative of the distance of the gap or of a proportionality of a dielectric medium in front of the sensor. In addition to measuring a distance of a gap, the sensor may also be used to determine a change in a dielectric of a fluid flowing in front of the sensor, or the thickness of a material.

The sensor 10 comprises three adjacent conductive plates 16, 18, and 19 that are electrically isolated from each other. The second (active shield) plate 16 shields the first (sensor) plate 18 from surfaces behind the sensor, and from the third (passive shield) plate 19. The sensor plate 18 faces the surface 12 and the gap. The sensor plate is used to measure the capacitance across the gap and is oriented parallel to the surface. The active shield plate 16 is immediately behind the sensor plate 18 and actively shields the sensor plate by being connected as an input to an operational amplifier 20 that also has an input from the sensor plate 18.

In addition to measuring a gap displacement, the sensor 10 may also be applied to measure a depth of a fluid and the thickness of a material. The capacitance 23 signal from the sensor plate 18 is influenced by the dielectric of the adjacent medium. The adjacent medium may be, for example, an air gap between the sensor plate and another surface 12, a fluid across the sensor plate or a solid material abutting the sensor plate. The dielectric of the adjacent medium effects the capacitance 23 which in turn effects the signal from the sensor plate. The dielectric of the medium adjacent the sensor plate may be indicative of: a depth of or impurities in a fluid—where the fluid is the medium, or the thickness of or impurities in a solid—where the solid is the medium. Accordingly, the sensor may be used to measure the depth of a fluid, the thickness of a solid medium or impurities in a medium adjacent the sensor plate.

The passive shield plate 19 provides additional shielding from surfaces behind the sensor. As shown in FIG. 3, the passive shield plate 19 of the sensor is connected to ground through a resistor 17 which is mounted on the sensor. The resistor value may be between 0 ohms and 10000 ohms (10K Ω). The resistor 17 value may be selected such that the maximum amount of shielding is obtained from surfaces behind the sensor. The passive shield 19 is also connected to the active shield plate 18 through a resistor 21 to provide a dc current path for a not-OK circuit 36 to detect an opened or shorted connector. A short between the passive and active shield plates 18, 19 will generate a dc voltage on the input line 28 to the op-amp 20 and also to the not-OK circuit 36. Upon detecting the dc voltage, the not-OK circuit 36 disables the output driver 50 and the output signal 42 of the sensor circuit.

FIG. 3 is a schematic diagram of an electronic circuit for the sensor 10. The circuit includes an operational amplifier (op-amp) 20 having a capacitive feedback loop 22 to detect the capacitance 23 of the gap 14 between the sensor 10 and the surface 12. A high frequency signal 24 is applied to a non-inverting input 28 of the op-amp 20 and to the active shield plate 16 of the sensor. The high frequency signal may be between 1 kHz and 10 MHz, and have a non-varying peak-to-peak voltage of between 1 to 100 volts. The cyclical signal 24 is output by a high frequency generator or oscillator circuit 26 which provides a fixed amplitude ac signal.

The capacitance between the sensor plate 18 and the surface 12 sets the high frequency gain (output voltage change/input voltage change) of the op-amp 20. The capacitance 23 between the sensor and the surface 12 varies as a function of gap 14. The voltage gain of the op-amp 20 likewise varies as a function of the gap 14. A constant high frequency signal 24 is applied to the non-inverting input 28 and a signal output from the sensor plate 18 is applied to the inverting input 30. Because the high frequency signal 28 has a constant amplitude and the voltage gain of the op-amp 20 varies as a function of the gap capacitance 23, the output voltage of the op amp changes as a function of the gap.

The inverting input 30 of the op-amp is connected to the sensor plate 18. The op-amp 20 maintains the sensor plate signal applied to the inverting input 30 equal to the high frequency signal 24 applied to the non-inverting input 28 and to the active shield plate 16. Because the signal is equal at both op-amp inputs 28, 30, the impedance between the sensor plate and the active shield plate is not a part of the measurement. The capacitance and impedance variations which do occur between the two inputs, between the plates of the sensor and between the conductors in the cable connecting the circuit to the sensor are substantially eliminated.

The output signal 32 (Output) from the op-amp 20 is equal to:

Output=$V$in+$V$in×$C$(measurement)/$C$(Feedback)

Vin is the high frequency signal applied to the non-inverting input 28; C(measurement) is the capacitance between the sensor plate 18 and the surface 12, and C(feedback) 52 is the capacitance between the output 32 of the op-amp and the inverting input 30 of the op-amp. C(measurement) is the capacitive value 23 that is to be measured and is indicative of the gap 14 distance.

The difference between the high frequency signal 24 and the op-amp output signal 32 is indicative of the capacitance 23 of the gap 14 between the sensor plate 18 and surface 12. The op-amp output signal 32 and high frequency signal 24 are applied to a differential amplifier 34 that generates an oscillating voltage difference signal 37 indicative of the gain applied by the op-amp to the input signal 24 which in turn is indicative of the capacitance of the gap.

The voltage difference signal 37 is demodulated from the high frequency input signal using demodulator 38, e.g., a peak detector, and linearized 40. The final output voltage 42 is proportional to the gap 14 being measured. The measured capacitance (C(measurement)) 23 is inversely proportional to the gap. The linearizer 40 provides an output voltage 46 which is inversely proportional to the input voltage. An output driver 50 outputs 42 the output voltage 48 unless the non-OK circuit 36 has disabled the driver.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for non-contact measurement of a displacement between a surface and a capacitive sensor comprised of at least two superimposed conductive plates electrically insulated one from the other and a sensor circuit coupled to the plates, said method comprising:
   (a) positioning said capacitive sensor proximate to the surface such that the displacement is a distance of a gap between the surface and one of the plates;
   (b) applying a high frequency signal to at least one of the plates:
   (c) applying the high frequency signal and a signal from a sensor plate of the conductive plates to control a voltage gain of an amplifier in the circuit, said signal from the sensor plate being indicative of the displacement between the sensor and the surface;
   (d) differentiating an output of the amplifier and the high frequency signal, and
   (e) determining a magnitude of the displacement based on the difference between the output of the amplifier and the high frequency signal.

2. The method as in claim 1 wherein differentiating further comprises sensing a difference between a peak of the output of the amplifier and a peak of the high frequency signal.

3. The method as in claim 1 wherein controlling the gain further comprises applying the signal from the sensor plate and the high frequency signal as inputs to an operational amplifier.

4. The method as in claim 1 wherein controlling the gain further comprises applying the signal from the sensor plate and the high frequency signal as inputs to an operational amplifier and applying the output of the amplifier as feedback to the signal from the sensor plate.

5. The method as in claim 1 wherein differentiating further comprises linearizing the difference between the output of the amplifier and the high frequency signal.

6. The method as in claim 1 wherein controlling the gain further comprises applying the signal from the sensor plate and the high frequency signal as inputs to an operational amplifier, and wherein differentiating further comprises applying an output of the operational amplifier and the high frequency signal as inputs to a difference amplifier which generates a cyclical difference signal indicative of the gap, and applying the cyclical difference signal to a peak detector which generates a signal indicative of a peak value of the cyclical signal, and wherein said peak value is indicative of the gap.

7. The method as in claim 1 wherein said at least two superimposed conductive plates further comprises the sensor plate, an active shield plate and a passive shield plate, wherein said high frequency signal is applied to the sensor plate and to the active shield plate, and said passive shield plate is insulated from the active shield plate and the sensor plate, and said method further comprises connecting the passive shield plate to a ground via a resistive connection.

8. The method as in claim 1 wherein said at least two superimposed conductive plates further comprises the sensor plate, an active shield plate and a passive shield plate, wherein said high frequency signal is applied to the sensor plate and to the active shield plate, and said passive shield plate is insulated from the active shield plate and the sensor plate, and said method further comprises grounding the passive shield plate and coupling the passive shield plate to the high frequency signal via a resistive conductive path.

9. The method as in claim 8 further comprising monitoring the high frequency signal for a direct current (dc) signal induced by the coupling of the passive shield plate and, when a dc signal is detected, inhibiting the determination of the value of the displacement.

10. A method for measurement of a characteristic of a medium proximate a capacitive sensor comprised of at least three superimposed conductive plates electrically insulated from each other and a sensor circuit coupled to the plates, wherein said plates include a sensor plate, an active shield plate sandwiched between a sensor plate and a passive shield plate, said method comprising:
   (a) positioning the capacitive sensor proximate to the medium, such that the medium is capacitively coupled to the sensor plate;
   (b) applying a high frequency signal to the active shield plate, wherein the medium affects a response of the sensor plate to the high frequency signal;
   (c) applying a signal induced on the sensor plate by the high frequency signal and the high frequency signal to control a voltage gain of an amplifier in the circuit, said applied signal induced by the high frequency signal being indicative of the medium;
   (d) differentiating the output of the amplifier and the high frequency signal, and
   (e) determining a magnitude value indicative of a width of the medium based on the difference between the applied signal induced by the high frequency signal and the high frequency signal.

11. The method as in claim 10 wherein the medium is a gap between the sensor plate and a surface, and the value is a distance across the gap.

12. The method as in claim 10 wherein the gap is filled with a non-conductive medium and the distance is a thickness of the non-conductive medium.

13. The method as in claim 10 wherein the medium is a fluid and the value is indicative of a dielectric of the fluid.

14. The method as in claim 10 wherein controlling the gain further comprises applying the applied signal induced on the sensor plate and the high frequency signal as inputs to an operational amplifier, and wherein differentiating further comprises applying an output of the operational amplifier and the high frequency signal as inputs to a difference amplifier which generates a cyclical difference signal indicative of the gap, and applying the cyclical difference signal to a peak detector which generates a signal indicative of a peak value of the cyclical signal, and wherein said peak value is indicative of the gap.

15. The method as in claim 10 wherein said method further comprises grounding the passive shield plate.

16. The method as in claim 10 wherein said method further coupling the passive shield plate to the high frequency signal via a resistive conductive path and connecting the passive shield plate to a ground via a resistive connection.

17. The method as in claim 16 further comprising monitoring the high frequency signal for a direct current (dc) signal shift induced by a change in the coupling of the passive shield to ground and, when a dc signal shift is detected, inhibiting the determination of the value of the displacement.

18. A method for non-contact measurement of a dielectric related characteristic of a medium between a surface and a capacitive sensor comprised of at least two superimposed conductive plates electrically insulated one from the other and a sensor circuit coupled to the plates, said method comprising:
  (a) positioning said capacitive sensor proximate to the surface such that the medium is between the surface and a sensor plate of the plates;
  (b) applying a high frequency signal to at least one of the plates and a dielectric of the medium affects a response signal of the sensor plate to the high frequency signal;
  (c) applying the high frequency signal and the response signal from the sensor plate to control a voltage gain of an amplifier in the circuit, said response signal being indicative of the medium between the sensor and surface;
  (d) differentiating an output of the amplifier and the high frequency signal, and
  (e) determining a magnitude of the displacement based on the difference between the output of the amplifier and the high frequency signal.

19. The method as in claim 18 wherein the medium is a gap between the sensor plate and a surface, and the value is a distance across the gap.

20. The method as in claim 18 wherein the gap is filled with a non-conductive medium and the distance is a thickness of the non-conductive medium.

21. The method as in claim 18 wherein the medium is a fluid and the value is indicative of a dielectric of the fluid.

22. A method for non-contact measurement of a medium proximate to a capacitive sensor comprised of at least two superimposed conductive plates electrically insulated one from the other and a sensor circuit coupled to the plates, said method comprising:
  (a) positioning said capacitive sensor proximate to the medium;
  (b) applying a high frequency signal to at least one of the plates;
  (c) applying the high frequency signal and a signal from a sensor plate of the conductive plates to control a voltage gain of an amplifier in the circuit, said signal from the sensor plate being indicative of a property of the medium;
  (d) differentiating an output of the amplifier and the high frequency signal, and
  (e) determining a magnitude of the property of the medium based on the difference between the output of the amplifier and the high frequency signal.

23. The method as in claim 22 wherein the medium is a fluid and the property is a depth of the fluid.

24. The method as in claim 22 wherein the medium is a solid and the property is a thickness of the solid.

25. The method as in claim 22 wherein the medium is a fluid and the property is a degree of impurities in the fluid.

26. The method as in claim 22 wherein the medium is a solid and the property is a degree of impurities in the solid.

27. The method as in claim 22 and differentiating further comprises sensing a difference between a peak of the output of the amplifier and a peak of the high frequency signal.

28. The method as in claim 22 wherein controlling the gain further comprises applying the signal from the sensor plate and the high frequency signal as inputs to an operational amplifier.

29. The method as in claim 22 wherein controlling the gain further comprises applying the signal from the sensor plate and the high frequency signal as inputs to an operational amplifier and applying the output of the amplifier as feedback to the signal from the sensor plate.

30. The method as in claim 22 wherein differentiating further comprises linearizing the difference between the output of the amplifier and the high frequency signal.

31. The method as in claim 22 wherein controlling the gain further comprises applying the signal from the sensor plate and the high frequency signal as inputs to an operational amplifier, and wherein differentiating further comprises applying an output of the operational amplifier and the high frequency signal as inputs to a difference amplifier which generates a cyclical difference signal indicative of the property, and applying the cyclical difference signal to a peak detector which generates a signal indicative of a peak value of the cyclical signal, and wherein said peak value is indicative of the property.

32. The method as in claim 22 wherein said at least two superimposed conductive plates further comprises the sensor plate, an active shield plate and a passive shield plate, wherein said high frequency signal is applied to the sensor plate and to the active shield plate, and said passive shield plate is insulated from the active shield plate and the sensor plate, and said method further comprises connecting the passive shield plate to a ground via a resistive connection.

33. The method as in claim 22 wherein said at least two superimposed conductive plates further comprises the sensor plate, an active shield plate and a passive shield plate, wherein said high frequency signal is applied to the sensor plate and to the active shield plate, and said passive shield plate is insulated from the active shield plate and the sensor plate, and said method further comprises grounding the passive shield plate and coupling the passive shield plate to the high frequency signal via a resistive conductive path.

34. The method as in claim 22 further comprising monitoring the high frequency signal for a direct current (dc) signal induced by the coupling of the passive shield plate and, when a dc signal is detected, inhibiting the determination of the value of the displacement.

* * * * *